Dec. 5, 1944.  F. VOGEL  2,364,496
AIRSHIP PROPULSION
Filed Dec. 20, 1943  2 Sheets-Sheet 1
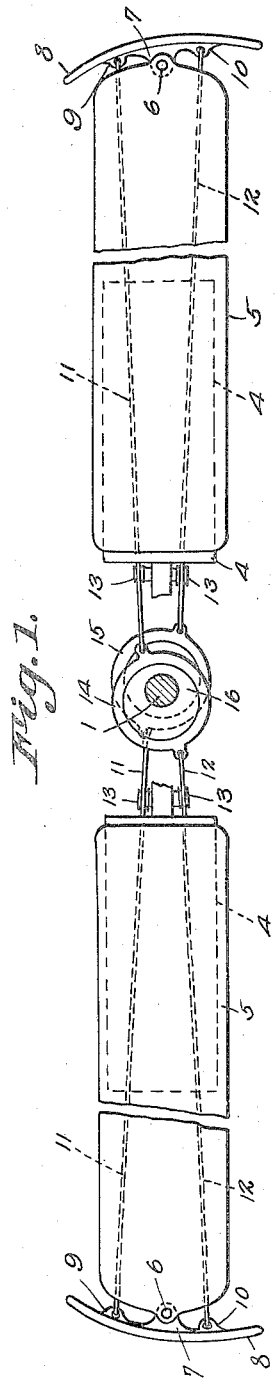
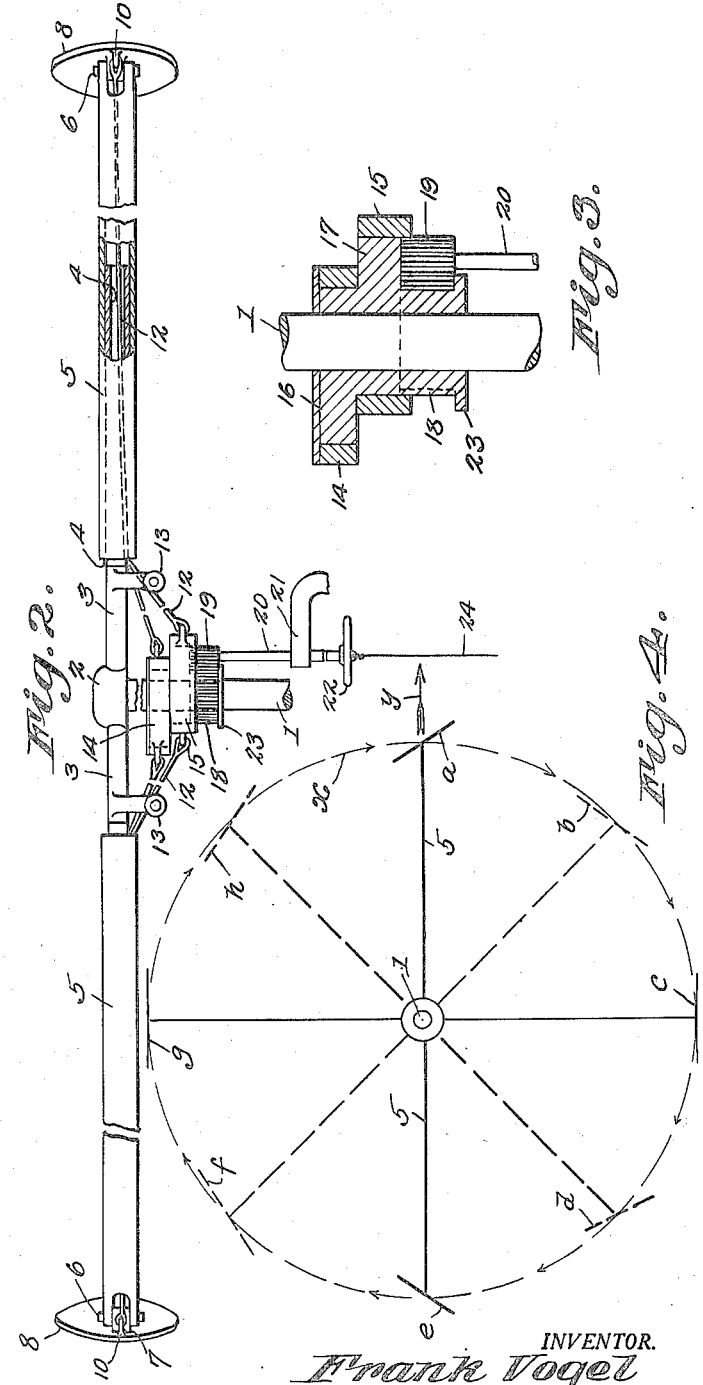
INVENTOR.
Frank Vogel
BY
ATTORNEYS.

Dec. 5, 1944.    F. VOGEL    2,364,496
AIRSHIP PROPULSION
Filed Dec. 20, 1943    2 Sheets-Sheet 2
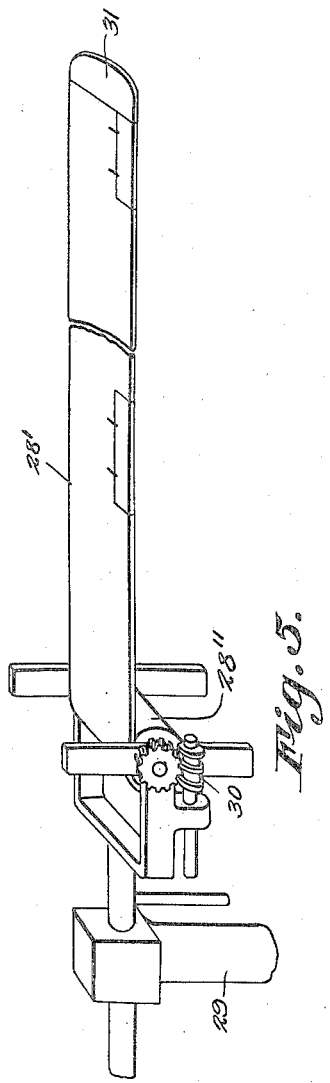
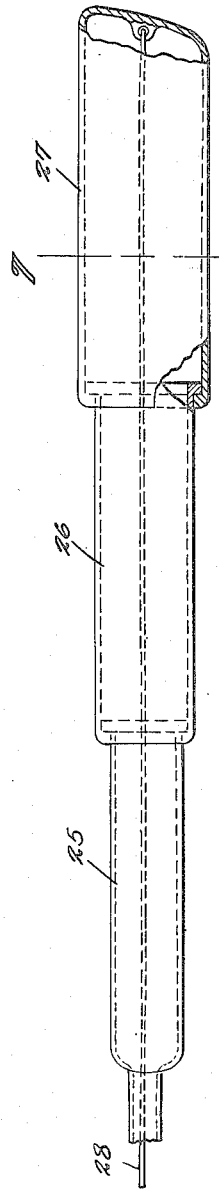
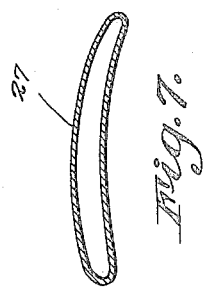
Frank Vogel
INVENTOR.
BY
ATTORNEYS.

Patented Dec. 5, 1944

2,364,496

UNITED STATES PATENT OFFICE 2,364,496

AIRSHIP PROPULSION

Frank Vogel, Philadelphia, Pa.

Application December 20, 1943, Serial No. 515,017

1 Claim. (Cl. 244—17)

This invention relates to airship propulsion and resides more especially in rotatable wings for effecting lift and also for driving the airship in any selected direction.

An object of the invention is to provide the rotatable wings or blades with adjustable means under the control of the operator whereby during the operation of the wings or blades to lift and sustain an airship, they can also be utilized to propel the airship forwardly or in any other selected direction.

A still further object is to provide rotatable wings or blades which can be extended or retracted as desired so as to vary the wing spread to meet the requirements.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred forms of the invention have been shown.

In said drawings

Figure 1 is a top plan view of the wings or blades embodying the present improvement.

Figure 2 is a front elevation thereof, parts being broken away.

Figure 3 is an enlarged section through the adjustable eccentric utilized for controlling the variations in wing spread.

Figure 4 is a view showing, in diagram, the action of the paddles on the wings whereby a direction of flight can be controlled.

Figure 5 is a perspective view of a modified form of extensible wing which is also flexible.

Figure 6 is a plan view of a telescopic wing of modified form, portions being broken away.

Figure 7 is a section on line 7—7, Fig. 6.

Referring to the figures by characters of reference, 1 designates an upwardly extended shaft adapted to be driven at any desired speed by a power unit meeting the requirements and which has not been shown. To this shaft is secured a hub 2 of any desired construction which has oppositely extended arms 3 to which are connected the lifting wings or propellers. In the structure shown in Figs. 1 and 2 each wing includes an inner member 4 fixedly joined to arm 3 and an outer member 5 slidably mounted on the inner member and extended longitudinally thereof so that these members are thus telescopically joined.

The outer member 5 is provided, at its outer end, with a pivot bolt 6 or the like extended upwardly within the member and providing means for connecting to said member a bracket 7 provided on the inner or concave surface of a paddle 8. The surfaces of the paddle are curved about an axis extended upwardly and downwardly through the wing and carried by the inner side of each paddle at opposite sides of the pivot bolt 6 are ears 9 and 10 to which are secured controlling cables 11 and 12 respectively which are extended through the members 4 and 5. This is permitted because these members are hollow, the inner member 4 being open at its ends.

Supported from the arms 3 adjacent to the inner ends of the members 4 are guide pulleys 13 over which the cables 11 and 12 are extended and from which said cables are directed downwardly toward upper and lower rings 14 and 15 mounted on oppositely arranged superposed eccentrics 16 and 17 respectively. A gear 18 can be extendded from the lower eccentric 17 and is concentric with the shaft 1 on which the eccentrics are mounted. The eccentrics normally are fixed but the shaft 1 is adapted to rotate at any desired speed therein. The rings 14 and 15 are adapted to rotate on the eccentrics and this rotation takes place because the cable 11 of one wing and the cable 12 of the opposed wing are joined to diametrically opposed portions of the ring 14 while the remaining cables are joined to diametrically opposed portions of the ring 15. Therefore as the wings rotate with shaft 1, motion will be transmitted therefrom through the cables to the rings but as these rings rotate on oppositely disposed eccentrics, their rotation results in a change in the relative positions of the cables 11 and 12 with the result that during each complete rotation of a wing, the paddle at the end thereof will shift its angle relative to the path of rotation as indicated, for example, in Fig. 1. In other words with the eccentrics 16 in one position and the shaft and wings rotating, a paddle, while rotating in the direction of the arrow $x$ in Fig. 4 will, while in one extreme position, assume the angle shown for example at $a$. As the wing and paddle continue to rotate in the direction of the arrow, the blade will gradually shift as shown at $b$ until it comes to feathering position as at $c$. Thereafter the movement of the paddle will be reversed as at $d$ until it reaches its other extreme position $e$ which is diametrically opposite to the position $a$. The swinging action of the paddle will then continue gradually through position $f$ to feathering position $g$ and thence through position h back to the forward extreme position a. While moving from positions h to b the paddle will tend to displace air toward shaft 1, thereby imparting a propelling force substantially in the direction of arrow y in Fig. 4. As the paddle moves from position d to position f it will exert a rearward displacement of air away from shaft 1 so as to supplement the thrusting action exerted by the paddle while travelling from position h to position b. Thus it will be noted that while the wings are being driven for the purpose of lifting the airship and for maintaining it at a predetermined altitude, the paddles, by proper adjustment, can be caused to propel the airship in a selected direction.

The means employed for adjusting the eccentric angularly with reference to the shaft 1 can include any one of various mechanisms. For example, the lower portion of the eccentric can have a gear 18 as before pointed out. In that case the gear will be in constant mesh with a smaller gear 19 mounted on a shaft 20 adapted to be controlled by the operator. This shaft can be slidable longitudinally and rotatable in a guiding bracket and bearing 21 fixedly mounted and a hand-wheel 22 or the like on shaft 20 can be utilized for moving the shaft longitudinally and for rotating it. A supporting flange 23 can be carried by the lower end of gear 18 so as to extend under gear 19 and hold it up in position. Furthermore this gear 19 can be held in mesh with gear 18 by any suitable means. For example the lower portion of ring 15 could be used for that purpose.

From the foregoing it will be apparent that when it is desired to retract the wings by pulling the members 5 inwardly along the members 4, shaft 20 can be pulled downwardly by wheel 22 and this will pull on the eccentric through gears 19 and 18 and cause them, in turn, to pull the rings 14 and 15 downwardly. Thus the cables will be pulled downwardly relative to the supporting pulleys 13 and cause the members 5 to be drawn toward each other. This would not change the angles at which the paddles 8 are being held. However by rotating shaft 20 so as to cause gear 18 to rotate, the eccentrics 16 and 17 will likewise be rotated so that the relative positions of the cables will be shifted and the paddles will be caused to reach their maximum positions a and e at other points than those shown in Fig. 4.

Of course any suitable means can be employed for holding shaft 20 against upward movement after it has been pulled downwardly. For example the cable 24 secured to the lower end of shaft 20 can be tied to some fixed structure.

If the shaft 20 is unsecured against longitudinal movement and the wings caused to rotate, centrifugal force will cause the wings to extend to their maximum positions thus drawing the rings 14 and 15 upwardly and carrying with them the eccentrics 16 and 17, the gears 18 and 19 and the shaft 20. No matter what might be the position to which the wings are adjusted longitudinally, centrifugal force will maintain them in those positions while shaft 1 is rotating.

Under some conditions telescopic wings can be used without the end paddles as shown, for example, in Figs. 6 and 7. In this modified structure the wing is made up of three telescopically connected members 25, 26 and 27 and a single retracting cable 28 is all that would be required for reducing the wing spread. Mechanism necessary for this will be obvious and could include a slidable collar on the shaft having a non-eccentric ring to which the cables are joined.

In Fig. 5 there has been shown a structure wherein a flexible wing 28' is utilized. This wing is of a heavy flexible material which can be wound on a drum 28" rotatable with the shaft 29 and having mechanism 30 under the control of an operator whereby the drum can be rotated to wind or unwind the wing. Similar mechanism would be provided for each of the wings employed. A weight 31 is located at the outer end of the flexible weight. As the shaft 29 begins to rotate the wing 28' is paid out and centrifugal force will cause the weight 31 to maintain the wing in an out-spread position. This action will continue as the wing is let out any desired length and while the wing is of a flexible material, the speed of rotation can be such as to exert a desired lifting force. Obviously although only one wing has been illustrated, two or more could be joined to the shaft 29 for the purpose of attaining the desired lift.

What is claimed is:

A rotary wing for aircraft including a shaft, opposed blades rotatable therewith, paddles pivotally connected to the outer ends of the blades and mounted to swing about axes parallel with the shaft, means on the shaft and connected to the paddles for progressively changing the angles of the paddles to their path of movement during the rotation of the blades, thereby to exert displacement of air in one direction when each paddle reaches predetermined points diametrically opposed and to feather when reaching intermediate points, and means under the control of an operator for changing the positions of maximum displacement of the paddles during the rotation of the blades, each of said blades being extensible and contractible in the direction of its length, said paddle-shifting means constituting means for retracting the wing, said blades being extensible by centrifugal force when rotated by the shaft, and while under restraint.

FRANK VOGEL.